W. W. WILSON.
FASTENER.
APPLICATION FILED MAY 14, 1914.
1,144,576.
Patented June 29, 1915.
2 SHEETS—SHEET 1.
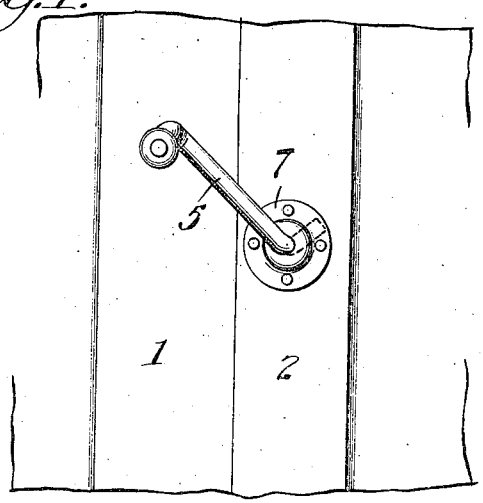
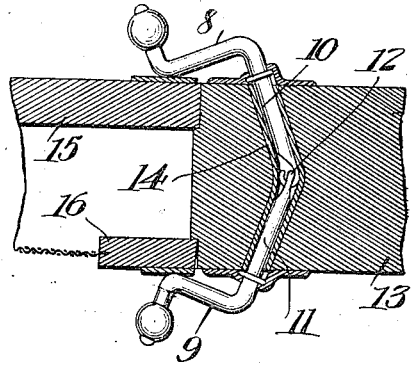
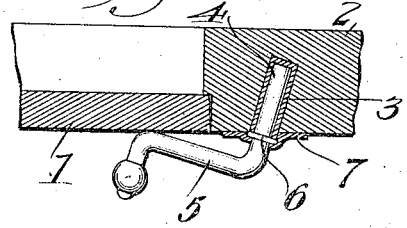
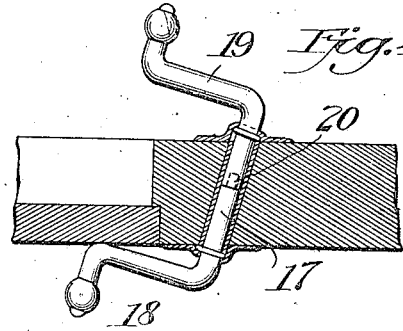
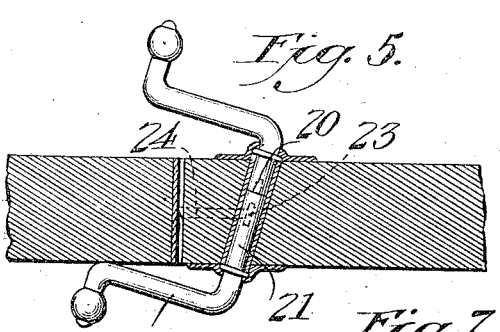
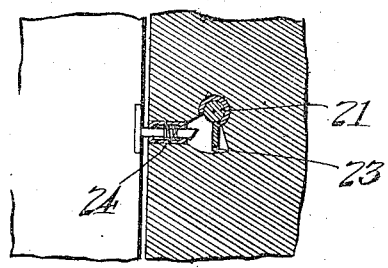
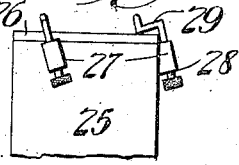
Witnesses
Inventor
W. W. Wilson
By E. B. Stocking
Attorney W. W. WILSON.
FASTENER.
APPLICATION FILED MAY 14, 1914.
1,144,576.
Patented June 29, 1915.
2 SHEETS—SHEET 2.
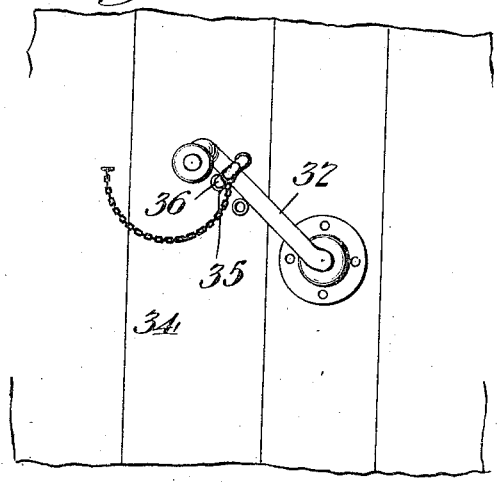
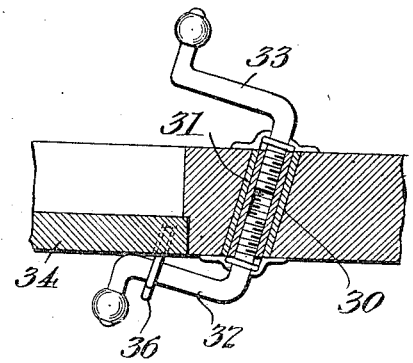
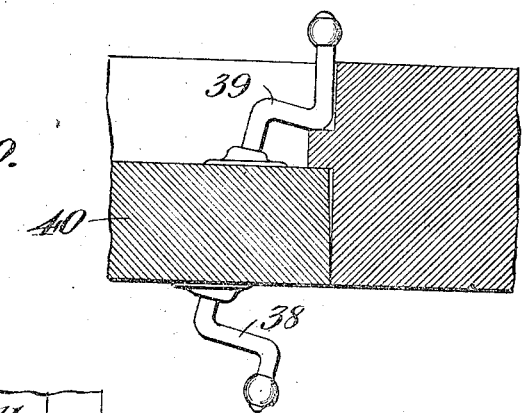
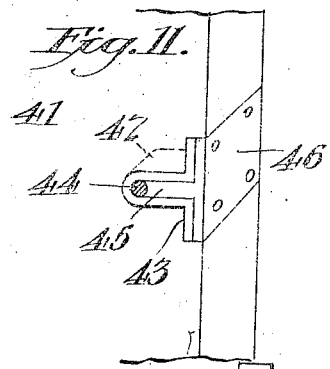
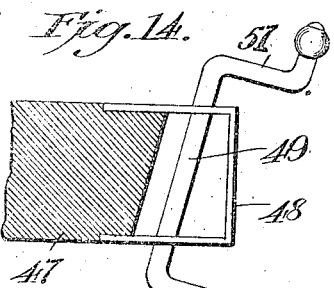
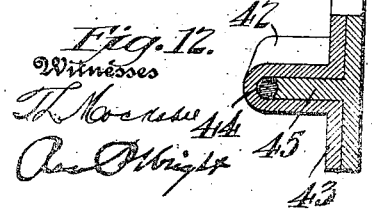
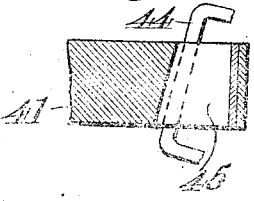
Inventor
W. W. Wilson
Attorney

UNITED STATES PATENT OFFICE.

WILLIAM W. WILSON, OF DALLAS, TEXAS.

FASTENER.

1,144,576.  Specification of Letters Patent.  Patented June 29, 1915.

Application filed May 14, 1914. Serial No. 838,561.

*To all whom it may concern:*

Be it known that I, WILLIAM W. WILSON, a citizen of the United States of America, residing at Dallas, in the county of Dallas and State of Texas, have invented certain new and useful Improvements in Fasteners, of which the following is a specification, reference being had therein to the accompanying drawing.

This invention relates to certain new and useful improvements in fasteners for holding a movable member in proper relation to a fixed member, the object being to provide a fastener in the form of a pivoted lever which is provided with a pivot mounted in a bearing disposed at an angle to the contacting faces of said members, whereby a cam action is obtained, so as to securely bind the two members together.

Another object of the invention is to provide a fastener which is exceedingly simple and cheap in construction, the same being composed of an angular lever having its pivot disposed at an angle which causes the lever to operate as a cam when brought into contact with a movable member.

Another and further object of the invention, is to provide a fastener which is especially adapted to be used in connection with doors and the like, whereby the door can be securely locked within its frame in such a manner that all danger of the same rattling or becoming accidentally opened, is prevented.

Other and further objects and advantages of the invention will be hereinafter set forth and the novel features thereof defined by the appended claims.

In the drawings—Figure 1, is a front elevation, showing the application of my improved construction of fastener to a door; Fig. 2, is a horizontal section; Fig. 3, is a horizontal section through a slightly modified form of fastener; Fig. 4, is a horizontal section, showing the application of still another form of fastener; Fig. 5, is a horizontal section through still another form of fastener; Fig. 6, is a vertical section in the form shown in Fig. 5; Fig. 7, is a detail section showing the application of a fastener constructed in accordance with my invention, to a receptacle, securing the cover in position thereon; Fig. 8, is an elevation showing means for locking the fastener; Fig. 9, is a horizontal section showing the manner of connecting the levers together by a threaded sleeve; Fig. 10, is a horizontal section showing the fastener applied to the door; Fig. 11, is a perspective showing another form of securing the levers within the door; Fig. 12, is a vertical section of Fig. 11; Fig. 13, is a horizontal section of Fig. 11; and Fig. 14, is a horizontal section of still another modified form.

Like numerals of reference refer to like parts in the several figures of the drawings.

In Figs. 1 and 2, 1 indicates a movable member which is in the form of a door, 2 a fixed member which is the door frame, said fixed member having an opening bored therein which extends upwardly and obliquely as shown, in which is mounted a bearing 3 in the form of a sleeve into which the pivot 4 of a lever 5 is adapted to extend, said pivot having an annular collar 6 formed integral therewith, which is engaged by a cap plate 7 secured to the door frame for securely holding the lever in position within its bearing so that the same can oscillate eccentrically in respect to the contacting faces, whereby the lever when swung upwardly will move outwardly from the door frame and when swung downwardly, will bind against the door so as to wedge the same in position within its jamb, in order to prevent the same from rattling or moving in any way and this construction of fastener is especially adapted to be used for doors of all kinds, but it has been found that it has great advantages when used in connection with refrigerator doors and the like when it is essential that an airtight joint be obtained.

It will be seen that the pivot of the lever is formed integral with the lever itself and is disposed at an angle to the contacting faces of said members so that a wedging action is obtained between the lever and movable member when the same is thrown into engagement therewith.

In the form of fastener shown in Fig. 3, a double lever fastener is disclosed which comprises a pair of angular levers 8 and 9 provided with pivots 10 and 11 constructed substantially as disclosed in Figs. 1 and 2, with the exception that the ends of the pivots are formed with eyes 12 adapted to be interlocked for securing the levers together, whereby they will be rotated in unison so as to throw the opposing levers into and out of engagement with the respective doors. In this figure, the door frame 13 is shown having a bearing tube 14 arranged therein which extends upwardly and obliquely from the opposite faces of the frame, meeting at the center at an acute angle. 15 indicates an ordinary door and 16 a screen door working in conjunction with the door frame, and it will be seen that the construction of fastener as herein shown, is capable of fastening both of the doors at the same time and in such a manner that when one of the fasteners is operated the other will be moved in unison so as to unfasten both of the doors or fasten the same, at the same time.

In the form shown in Fig. 4, the pivot 17 of the fastening lever 18 is extended and is provided with a handle 19 by means of which, the same can be operated from the opposite side of the door in order to allow the fastener to be opened or closed from either side. In this form, a lever constructed substantially as shown in Figs. 1 and 2, is employed but is preferably joined as shown at 20 to the lever 19, in order that the same can be readily inserted in the bearing sleeve arranged within the frame.

In the form shown in Figs. 5 and 6, a construction is disclosed substantially the same as disclosed in Fig. 4, with the exception that the pivot 21 of the lever 22 is provided with a depending lip 23 coöperating with a sliding spring-actuated bolt 24 which is adapted to be forced inwardly by the door when moving into closed position so as to throw the fastener into engagement with the door in order to securely lock the same.

In the modification shown in Fig. 7, 25 indicates a receptacle such as a barrel or can, and 26 the cover for closing the same; said receptacle having a number of obliquely disposed bearings 27 in which are mounted the pivots 28 of levers 29 which are adapted to coact with the cover 26 for securely holding the same in position.

In Figs. 8 and 9, I show a bearing 30 arranged within the door frame in which is mounted a threaded sleeve 31 into which the pivots of levers 32 and 33 are secured; the lever 32 being adapted to engage the door for holding the same in closed position; the manner of holding the sleeve within the bearing being substantially the same as disclosed in the preferred form of the invention. The door 34 is provided with spaced sockets 35 into which is adapted to extend a staple 36 which embraces the lever 32 so as to lock the same in order to prevent the same from being turned; said sockets being so arranged that when the prongs of the staple are in one pair of sockets, the lever is securely locked and when in another pair of sockets, the lever is free to turn in order to allow the door to be released. The staple is carried by a chain 37.

In the modification shown in Fig. 10, the pivots of the levers 38 and 39 are mounted within a suitable bearing secured within the door 40; the lever 39 being adapted to engage the door frame as clearly shown for clamping the door in closed position.

In the modification shown in Fig. 11, 12 and 13, the door 41 is provided with a notch in its edge in which is seated a bearing 42 substantially U-shaped in cross section having flanges 43; said bearing extending obliquely across the door. The pivot 44 of the lever is arranged within the bearing and is held therein by the stem 45 of a plate 46 secured over the flanges 43 of the bearing 42 by screws or the like. The bearing is so mounted in respect to the edge of the door that a cam action is obtained upon the lever in order to clamp the door securely within its frame.

In the modification shown in Fig. 14, a notch is formed in the edge of the door 47 in which is secured the U-shaped casting 48 having its side walls formed with bores out of transverse alinement, through which the pivot 49 of the levers 50 and 51, extend.

It will be seen that I have provided a fastener which can be used in connection with various forms of doors and closures and while I have shown the same in some instances applied to the door frame and in others to the door, it is of course understood that a cam action will be obtained by mounting the lever obliquely in respect to the abutting edges of the members in order to securely fasten or clamp the movable member against the fixed member.

From the foregoing description, it will be seen that I have provided a fastener which can be used in connection with any pair of members, one of which is movable in respect to the other and while I have shown and described the fastener used in connection with certain devices; I do not wish to limit myself, as the same can be constructed and used in connection with various other members without departing from the spirit of my invention.

I claim:

1. The combination with a pair of members arranged in substantially longitudinal alinement, one of said members being movable in respect to the other member, a bearing disposed obliquely in one of said members, and a gravity lever having a pivot disposed within said bearing engaging the other member for forcing and holding said members together.

2. In a fastener, the combination with a fixed member and a movable member, of a lever having a pivot mounted obliquely in one of said members for forcing and holding said members in contact.

3. In a fastener, the combination with a fixed member and a movable member, of a bearing disposed obliquely in the fixed member, an angled lever mounted in said bear ing for engaging the movable member, and a handle having a connection with said lever.

4. In a fastener, the combination with a fixed member and a movable member, of a bearing disposed at an angle in the fixed member, of a lever having a pivot mounted in said bearing and capable of contacting with the movable member, and a second lever mounted within said bearing having a pivot connected to the pivot of the first-mentioned lever.

5. In a fastener, the combination with a fixed member and a movable member having contacting faces, of a bearing disposed in the fixed member at an angle to the contacting faces of said members, a lever having a pivot mounted in said bearing, a projection on said pivot, and a pin coöperating with said projection and movable member, for throwing said lever into contact with said movable member.

6. The combination with a pair of abutting members, of a bearing disposed obliquely in one of said members, a lever having a pivot mounted in said bearing engaging the opposite member for forcing and holding said members in contact, and means for locking said lever in adjusted position.

In testimony whereof I hereunto affix my signature in the presence of two witnesses.

WILLIAM W. WILSON.

Witnesses:
 WOODSON WHITE,
 J. F. McCAIN.